United States Patent
Schlemmer et al.

(10) Patent No.: US 10,005,374 B2
(45) Date of Patent: Jun. 26, 2018

(54) PRISMATIC ACCUMULATOR CELL AND ACCUMULATOR PACK

(71) Applicant: Robert Bosch GmbH, Stuttgart (DE)

(72) Inventors: Guenter Schlemmer, Eltmann (DE); Alexander Klonczynski, Bangalore (IN); Timo Kegel, Memmelsdorf (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/196,162

(22) Filed: Jun. 29, 2016

(65) Prior Publication Data

US 2017/0005317 A1    Jan. 5, 2017

(30) Foreign Application Priority Data

Jun. 30, 2015   (DE) .................. 10 2015 212 219

(51) Int. Cl.
| | |
|---|---|
| *H01M 2/30* | (2006.01) |
| *H01M 2/20* | (2006.01) |
| *H01M 2/04* | (2006.01) |
| *H01M 2/02* | (2006.01) |
| *H01M 10/48* | (2006.01) |
| *B60L 11/18* | (2006.01) |
| *H01M 10/42* | (2006.01) |

(52) U.S. Cl.
CPC ....... *B60L 11/1862* (2013.01); *B60L 11/1851* (2013.01); *H01M 2/0473* (2013.01); *H01M 2/0482* (2013.01); *H01M 2/206* (2013.01); *H01M 2/305* (2013.01); *H01M 2/0217* (2013.01); *H01M 10/482* (2013.01); *H01M 2010/4271* (2013.01); *H01M 2220/20* (2013.01)

(58) Field of Classification Search
CPC .. H01M 2/0473; H01M 2/0482; H01M 2/206; H01M 2/305; H01M 2/0217; H01M 10/482; H01M 2010/4721; H01M 2220/20; B60L 11/1862; B60L 11/1851
See application file for complete search history.

(56) References Cited

U.S. PATENT DOCUMENTS

| | | | | |
|---|---|---|---|---|
| 2010/0081048 | A1* | 4/2010 | Nansaka | H01M 2/06 429/158 |
| 2012/0264007 | A1* | 10/2012 | Sasaki | H01M 2/043 429/182 |

(Continued)

FOREIGN PATENT DOCUMENTS

| | | |
|---|---|---|
| CN | 204118200 | 1/2015 |
| DE | 102012213673 | 2/2014 |

(Continued)

*Primary Examiner* — Gregg Cantelmo
(74) *Attorney, Agent, or Firm* — Michael Best & Friedrich LLP

(57) ABSTRACT

A prismatic accumulator cell (2) with a cuboid housing (4) and electrodes (10) arranged therein, wherein the electrodes (10) for the take-up and delivery of energy from the accumulator cell (2) are electrically connected to terminal connections (18), wherein the housing (4) is provided with a cover area (24) which accommodates the terminal connections (18) and at least one area provided with an insulating material cladding (26). The accumulator cell (2) is provided with at least one metal contact pin (28), which is electrically connected to one of the two electrodes (10), and is routed through the insulating material cladding (26).

11 Claims, 2 Drawing Sheets

(56) References Cited

U.S. PATENT DOCUMENTS

2014/0023885 A1* 1/2014 Choi .................. H01M 2/34
          429/7
2014/0050944 A1  2/2014 Bertucci et al.
2014/0356668 A1  12/2014 Kim

FOREIGN PATENT DOCUMENTS

DE   102013207357       10/2014
JP       02046664 A  *  2/1990  ............. H01M 2/30
JP     2013073795 A  *  4/2013

* cited by examiner

PRISMATIC ACCUMULATOR CELL AND ACCUMULATOR PACK

BACKGROUND OF THE INVENTION

The invention relates to a prismatic accumulator cell with a cuboid housing and electrodes arranged therein.

An accumulator pack with a plurality of prismatic accumulator cells is also provided.

Hereinafter, the terms "battery" and "battery cell", in accordance with general linguistic usage, are conventionally applied for "accumulator" and "accumulator cell" respectively. Hereinafter, an electrochemical cell is referred to as a battery cell or cell, for short. Typically, in a battery, a plurality of battery cells are preferably spatially combined and interconnected in circuit, for example in series or in parallel, to form modules, in order to deliver the requisite performance characteristics. A number of modules form an accumulator pack.

In high-capacity battery systems, as used for example in hybrid vehicles, electric vehicles or stationary energy storage systems, individual battery cells are electrically connected in series or in parallel to deliver required overall capacity.

The connection is commonly formed in that the cells are arranged in spatial proximity to each other, then electrically connected by means of rigid metallic connecting elements, or cell connectors.

For the control and functional monitoring of a high-capacity battery system, information is required, including cell voltages, cell temperatures, module voltages and module temperatures. This information is routed to the corresponding control devices by the connection of electrically-cabled sensors to the cell connectors. The connection of instrument lines and sensors to the cell connectors is generally effected by means of plug-in, soldered or crimped connections.

A concept of this type is known, for example, from DE 10 2012 213 673 A1. Herein, a battery module is described with a plurality of battery cells and a plurality of cell connectors, wherein the cell connectors provide the electrically-conductive interconnection of the pole terminals of the battery cells. For the measurement of temperature and/or voltage, the cell connectors are provided with plug-in contacts, to which the corresponding instrument lines are connected.

A cylindrical polymer lithion-ion cell is known from CN 204118200 U, wherein the positive and negative terminals of the cell are arranged at an upper end and a lower end of a core element. One of the two poles is routed to the other side by means of a metal wire, where a plastic element is provided for the accommodation of a plug-in connector.

SUMMARY OF THE INVENTION

A prismatic accumulator cell is provided with a cuboid housing and electrodes arranged therein, wherein the electrodes for the take-up and delivery of energy from the accumulator cell are electrically connected to terminal connections, wherein the housing is provided with a cover area which accommodates the terminal connections and the at least one area provided with an insulating material cladding, which cell is provided with at least one metal contact pin, which is electrically connected to one of the two electrodes, and is routed through the insulating material cladding.

Advantageously, in the arrangement of the prismatic accumulator cell according to the invention, the connection of at least some of the instrument lines and sensors is effected, not by means of the cell connectors, but by means of at least one metal contact pin. The metal contact pin, provided in addition to the terminal connectors, is directly connected to one of the two electrodes, thus providing a robust bond. A high quality of connection is achieved accordingly.

According to one form of embodiment, the metal contact pin is routed through the housing wall, but can also terminate below the cover.

The insulating material cladding can be formed, for example, of a plastic material, wherein further alternatives will also be possible for a person skilled in the art, which provides sufficient insulation in respect of the terminal connections of the battery and/or in respect of the cell connectors.

According to a preferred form of embodiment, the metal contact pin is arranged in a connector housing. By the provision of a plug-in arrangement, a particularly simple and robust electrical connection to a cable harness can be provided. The term cable harness designates the cable and further devices, such as mating connectors, which are required for the electrical bonding of a plurality of prismatic accumulator cells in an accumulator pack.

According to one form of embodiment, the metal contact is configured as a stamped bent part. Configuration as a stamped bent part is, firstly, exceptionally cost-effective, and secondly is sufficiently robust to deliver a reliable output for the temperature and/or voltage of the prismatic accumulator cell, for example in respect of temperature or voltage.

According to a preferred form of embodiment, the terminal connections for the take-up and delivery of energy from the accumulator cell are arranged eccentrically on the cover area, wherein a mutually opposing and eccentric arrangement is specifically preferred. The opposing eccentric arrangement of the terminal connections reduces the possibility of the formation of a short-circuit by the bridging of the gap between the terminal connections.

Conversely, the contact pin is preferably arranged centrally in the cover area of the housing. An advantageous reduction in the complexity of the cable harness can thus be achieved, specifically a reduction in the length of the cable harness and a simplification of the construction of the cable harness. With a centrally-arranged contact pin, the topology of the eccentric terminal connections permits a simplification of the construction of the cable harness, and the simultaneous achievement of the secure separation of the pole terminals of the battery.

The prismatic accumulator cell can be provided with one or more metal contact pins as described above. If the prismatic accumulator cell is provided, for example, with two metal contact pins, the latter are preferably electrically connected to one of the two electrodes respectively, and routed through the insulating material cladding. A first metal contact pin is electrically connected to the first of the two electrodes, and the second metal contact pin is electrically connected to the second of the two electrodes. By this arrangement, information can be delivered on the voltage difference between the two electrodes, and on the temperature at various different points within the battery.

It is specifically preferred that a plurality of prismatic accumulator cells according to the invention are combined in an accumulator pack. Accordingly, the invention also encompasses an accumulator pack with a plurality of prismatic accumulator cells, which are configured as described. The accumulator cells are electrically interconnected in parallel and/or in series by means of cell connectors, in order to deliver the requisite capacity. The cell connectors are electrically bonded to the terminal connections of the accumulator cells, and permit the take-up and delivery of energy from the accumulator cells to the surrounding environment, for example to an electric motor.

According to a preferred form of embodiment, the metal contact pints are connected to instrument lines in a battery management system (BMS). The battery management system measures the battery current and the voltage of individual cells, individual modules or the entire battery, together with the temperature thereof, from which it ascertains e.g. the state of charge (SOC) of the battery cells, the state of health (SOH) of the battery cells, and the permissible battery capacity. In the event of overloading, in case of a departure from the SOC window or in case of overheating, the BMS protects e.g. the battery cells by switching off the system or by the generation of a switch-off instruction.

The metal contact pins can be connected to the instrument line of the battery management system by means of crimping or soldering. Alternatively, the metal contact pins can be connected to the instrument line of the battery management system by means of plug-in connectors. It may be provided that some metal contacts are connected to the instrument line of the battery management system by means of crimping or soldering, while other metal contact pins are connected to the instrument line of the battery management system by means of plug-in connectors.

The provision of a metal contact pin which is electrically connected to one of the two electrodes in an accumulator cell, and is routed through an insulating material cladding in a cover area of the cuboid housing, ensures robust electrical bonding of the accumulator cell for the delivery of measuring data. The cable harness can be reduced in both complexity and in length, such that construction is simplified accordingly.

If a tap-off is to be executed on both poles of the cell, a plurality of functions of the battery management system can be accommodated by the metal contact pins.

BRIEF DESCRIPTION OF THE DRAWINGS

Exemplary embodiments of the invention are represented in the drawings, and are described in greater detail in the following description.

Herein.

DETAILED DESCRIPTION

In the following description of exemplary embodiments of the invention, identical or similar components are represented by the same reference numbers such that, in individual cases, a repeated description of the components is omitted. The figures show only a schematic representation of the object of the invention.

Figure 1:
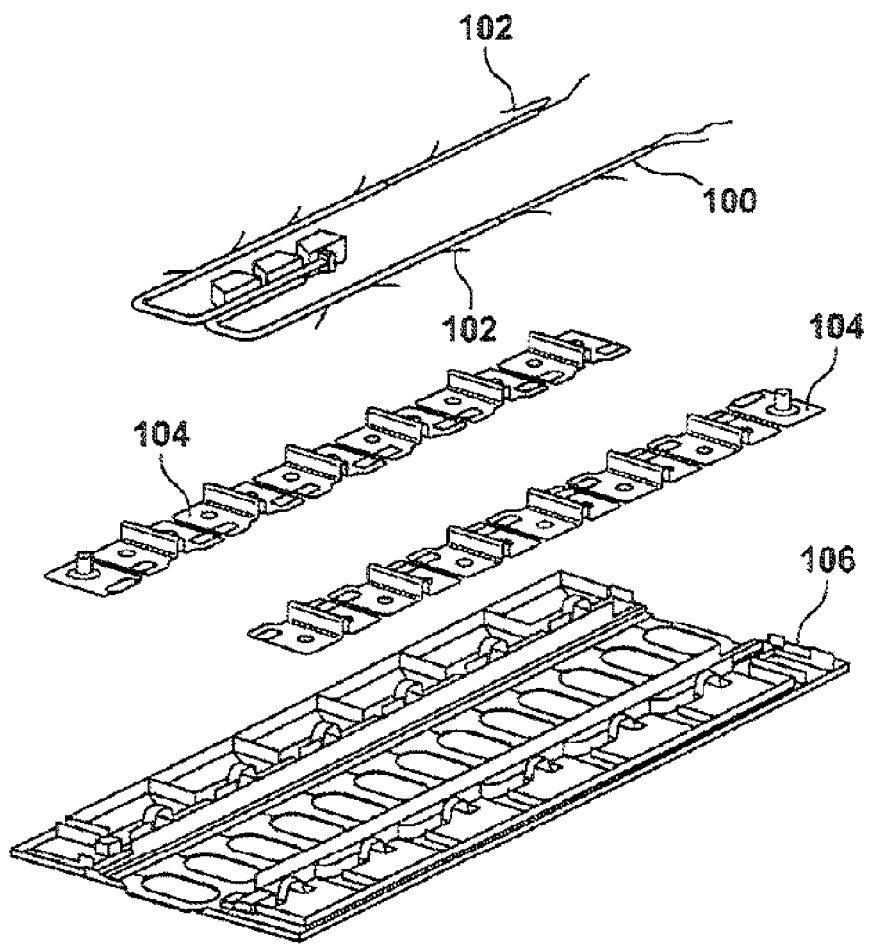
FIG. 1 shows an exploded view of part of an accumulator pack according to the prior art.

FIG. 1 shows an exploded view of parts of an accumulator pack according to the prior art. The accumulator cells of the accumulator pack are not represented. Accordingly, FIG. 1 shows a cable harness 100 with contact points 102 to unrepresented cell terminals. FIG. 1 also shows cell connectors 104, by means of which the cells are electrically interconnected in series and/or in parallel. FIG. 1 also shows a plastic cover 106 for the accommodation of the cell connectors 104 and the cable harness 100. The plastic cover 106 is configured such that its spans and combines a plurality of adjacently-arranged prismatic accumulator cells on their upper side.

The cable harness 100 executes a bonding function for the accumulator cells via the cell connectors 104. Accordingly, for each cell, two contact points 102 to the cell connectors 104 must be provided, such that the cable harness 100 essentially shows a U-shape, as represented, or is configured as a tree structure with a central string, from which two branches respectively radiate to the cell connectors 104 (not represented).

Figure 2:
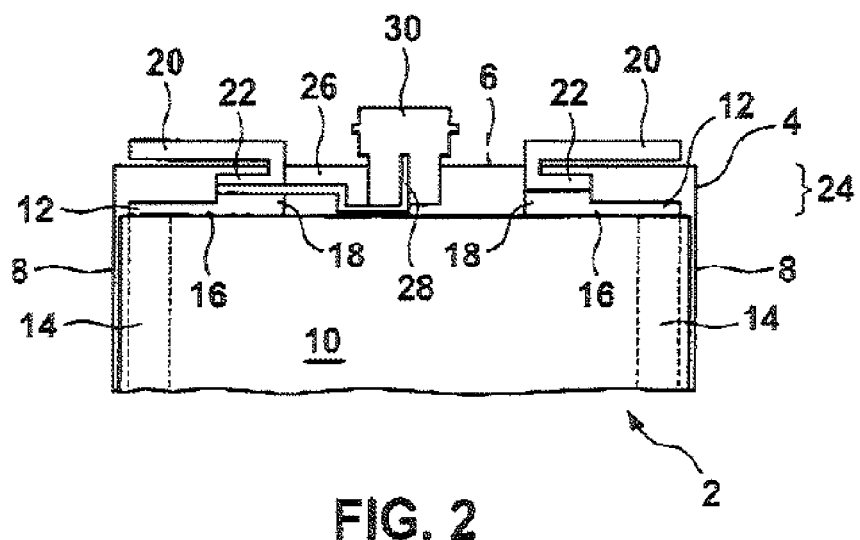
FIG. 2 shows a cross-sectional view of part of a prismatic accumulator cell according to one form of embodiment of the invention.

FIG. 2 shows the upper part of a prismatic accumulator cell 2 according to one form of embodiment of the invention, in a lateral cross-sectional view. The prismatic accumulator cell 2 comprises a solid housing 4, conversely to, for example, "pouch cells" or "coffee-bag cells". The solid housing 4 is essentially configured as a cuboid, and therefore comprises side walls 8 and a cover 6, wherein these can typically be of aluminum construction.

In the case of lithium-ion accumulator cells, the cover 6 is typically provided with a filler opening for a liquid electrolyte, which is not represented. The cover 6 may also be provided with devices such as bursting membranes or other safety devices, which are likewise not represented.

In the cuboid housing 4, electrodes 10 are arranged, which are typically designated as the anode and cathode and which constitute the positive and negative electrode respectively of the prismatic accumulator cell 2. For the take-up and delivery of energy from the prismatic accumulator cell 2, the electrodes 10 are connected to current collectors 12 which, in the exemplary embodiment represented, are provided with vertically-oriented electrode bonding sections 14 and with horizontally-oriented pennant-shaped sections, terminating respectively in terminal connections 18 projecting on the upper side. For the take-up and delivery of energy from the prismatic accumulator cell 2, the electrodes 10 are therefore electrically bonded to the terminal connections 18. In the present exemplary embodiment, welding sections 22 of the cell connectors 20 are welded to the terminal connections 18, in order to permit the interconnection in circuit of a plurality of such prismatic accumulator cells 2.

In certain forms of embodiment, the terminal connections 18 project above the cover 6, and are only bonded to the cell connectors 20 in the part which projects above the cover 6. Bonding may be effected, for example, by means of welding, but also by crimping or soldering.

In the form of embodiment represented, an insulating material cladding 26 is applied to the exterior of a cover area 24. The cover area 24 designates, for example, the area of the prismatic accumulator cell 2 above the electrodes 10. The insulating material cladding 26 may consist, for example, of plastic.

On one of the two terminal connections 18, a metal contact pin 28 is secured, for example by welding, soldering or clamping. In the exemplary embodiment represented, the metal contact pin 28 is arranged between the cell connector 20 and the terminal connection 18. In other forms of embodiment, bonding of the metal contact pin 28 to the corresponding electrode 10 may also be effected in the area of the pennant-shaped section 16 or in the area of the electrode bonding section 14. In the exemplary form of embodiment represented, the metal contact pin 28 is configured as a stamped bent part, which can be cost-effectively manufactured, and which projects above the cover 6. In further forms of embodiment, the metal contact pin 28 can also terminate below the cover 6.

The insulating material cladding 26 can be manufactured, for example, by injection-molding. Accordingly, the metal contact pin 28 can be molded into the insulating material cladding 26, such that it is insulated from the other metal components of the prismatic accumulator cell 2, and from the electrolytes.

In the form of embodiment represented, the metal contact pin 28 is also arranged in a connector housing 30. The connector housing 30 can also be manufactured as an injection-molded component, which is either inserted subsequently into the insulating material cladding 26, for example by screwing in or clamping or, in other forms of embodiment, is manufactured integrally with the insulating material cladding 26. The connector housing 30 is designed for the accommodation of an appropriate mating connector of the cable harness (not represented).

Figure 3:
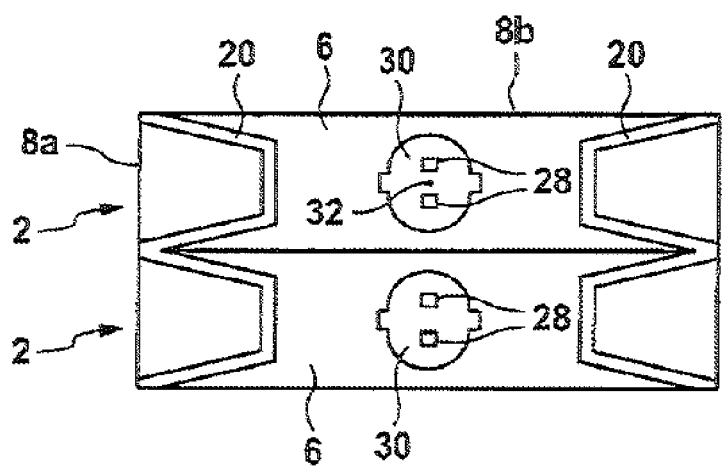
FIG. 3 shows an overhead view of the two interconnected prismatic accumulator cells according to one form of embodiment of the invention.

FIG. 3 shows an overhead view of two adjacently-arranged prismatic accumulator cells 2 according to one form of embodiment of the invention. The cuboid prismatic accumulator cells 2 are provided with one short side wall 8a and one long side wall 8b.

The prismatic accumulator cells 2 are arranged contiguously to each other on their respective long side wall 8b. For example, the prismatic accumulator cells 2 are interconnected in series by means of the cell connectors 20. In principle, the cell connectors 20 can assume any form required, but in the form of embodiment represented they follow a somewhat meandering profile across a plurality of prismatic accumulator cells 2 in an accumulator pack. In the form of embodiment represented, the prismatic accumulator cell 2, again considered in overhead view, comprises a connector housing 30 which is arranged centrally in the cover 6. In this form of embodiment, the prismatic accumulator cells 2 each comprise two metal contact pins 28. One metal contact pin 28 respectively is connected to a corresponding electrode 10, such that information on the voltage in both electrodes 10 can be delivered. The connector housing 30 can be provided with form-fitting elements, which permit clear orientation for the bonding of the metal contact pin 28 with a corresponding mating connector (not represented). The metal contact pins 28 can be arranged symmetrically to a mid-point 32 on the cover 6 of the prismatic accumulator cell 2.

Likewise, the terminal connections 18 (not represented here, but discernible from the position of the cell connectors 20, with reference to FIG. 1) are also arranged eccentrically to the mid-point 32 of the cover 6, specifically in a mutually opposing eccentric arrangement.

The invention is not restricted to the exemplary embodiments described here, or to the aspects highlighted therein. Within the scope of disclosure of the claims, a plurality of variations are possible, which are consistent with the practice of a person skilled in the art.

The invention claimed is:

1. A prismatic accumulator cell (2) comprising a cuboid housing (4), wherein electrodes (10) for the take-up and delivery of energy from the prismatic accumulator cell (2) are arranged in the housing and are electrically connected to terminal connections (18), wherein the housing (4) is provided with a cover area (24) which accommodates the terminal connections (18) and at least one area provided with an insulating material cladding (26), characterized in that the prismatic accumulator cell (2) is provided with at least one metal contact pin (28), which is electrically connected to one of the electrodes (10), and is routed through the insulating material cladding (26), wherein the at least one metal contact pin (28) is arranged centrally to be evenly spaced between a first short side wall (8a) and a second short side wall (8a) of the cuboid housing (4).

2. The prismatic accumulator cell (2) according to claim 1, characterized in that the at least one metal contact pin (28) is arranged in a connector housing (30).

3. The prismatic accumulator cell (2) according to claim 1, characterized in that the at least one metal contact pin (28) is configured as a stamped bent part.

4. The prismatic accumulator cell (2) according to claim 1, characterized in that the terminal connections (18) are arranged eccentrically on the cover area (24).

5. The prismatic accumulator cell (2) according to claim 1, characterized in that the at least one metal contact pin (28) includes two metal contact pins (28), which are electrically connected to respective electrodes (10) and routed through the insulating material cladding (26).

6. An accumulator pack with a plurality of prismatic accumulator cells (2) according to claim 1, wherein the accumulator cells (2) are electrically interconnected in parallel and/or in series by means of cell connectors (20), and wherein the cell connectors (20) are electrically bonded to the terminal connections (18) of the accumulator cells (2).

7. The accumulator pack according to claim 6, characterized in that the metal contact pins (28) are connected to instrument lines of a battery management system.

8. The accumulator pack according to claim 7, characterized in that the metal contact pins (28) are connected to the instrument lines of the battery management system by crimping or soldering.

9. Accumulator pack according to claim 7, characterized in that the metal contact pins (28) are connected to the instrument lines of the battery management system by plug-in connectors.

10. The prismatic accumulator cell (2) according to claim 1, characterized in that the terminal connections (18) have a mutually opposing and eccentric arrangement on the cover area (24).

11. The prismatic accumulator cell (2) according to claim 5, wherein each of the two metal contact pins (28) is arranged centrally to be evenly spaced between the first and second short side walls (8a) of the cuboid housing (4).

* * * * *